United States Patent [19]
Mathur et al.

[11] Patent Number: 6,125,133
[45] Date of Patent: Sep. 26, 2000

[54] LANCE/BURNER FOR MOLTEN METAL FURNACE

[75] Inventors: Pravin Chandra Mathur, Bronx; Ronald Joseph Selines, North Salem; John Erling Anderson, Somers, all of N.Y.

[73] Assignee: Praxair, Inc., Danbury, Conn.

[21] Appl. No.: 08/819,812

[22] Filed: Mar. 18, 1997

[51] Int. Cl.[7] .................................................. F27D 17/00
[52] U.S. Cl. ................................................... 373/8; 373/22
[58] Field of Search ................................. 373/22, 24, 25, 373/8, 60, 63

[56] References Cited

U.S. PATENT DOCUMENTS

| | | | |
|---|---|---|---|
| Re. 33,464 | 11/1990 | Gitman | 432/13 |
| 3,216,714 | 11/1965 | Eibl et al. | 239/418 |
| 3,427,151 | 2/1969 | Koudelka et al. | 75/59 |
| 4,210,442 | 7/1980 | Lewis, III et al. | 75/60 |
| 4,362,556 | 12/1982 | Kishida | 75/10.42 |
| 4,373,949 | 2/1983 | Spruell et al. | 75/60 |
| 4,426,709 | 1/1984 | Fegerl et al. | 373/22 |
| 4,622,007 | 11/1986 | Gitman | 432/13 |
| 4,642,047 | 2/1987 | Gitman | 432/13 |
| 4,752,330 | 6/1988 | Gitman | 75/59.19 |
| 4,797,087 | 1/1989 | Gitman | 431/10 |
| 4,827,486 | 5/1989 | Brotzmann et al. | 373/2 |
| 4,890,562 | 1/1990 | Gitman | 110/236 |
| 4,923,391 | 5/1990 | Gitman | 431/10 |
| 5,377,960 | 1/1995 | Leczo et al. | 266/225 |
| 5,471,495 | 11/1995 | Berger et al. | 373/2 |
| 5,572,544 | 11/1996 | Mathur et al. | 373/8 |
| 5,599,375 | 2/1997 | Gitman | 75/10.42 |
| 5,714,113 | 2/1998 | Gitman et al. | 266/182 |
| 5,788,921 | 8/1998 | Gitman et al. | 266/225 |
| 5,843,368 | 12/1998 | Gitman et al. | 266/182 |
| 5,858,302 | 1/1999 | Gitman et al. | 266/182 |
| 5,904,895 | 5/1999 | Gitman et al. | 266/225 |
| 5,954,855 | 9/1999 | Gitman et al. | 75/10.42 |

FOREIGN PATENT DOCUMENTS

WO 9606954  3/1996  WIPO .

OTHER PUBLICATIONS

Robert E. Levinson, "Oxy–Gas Combustion System Developed for High Temperature Applications," *Industrial Heating* (Nov. 1986).

Jim Untz, "A New High Temperature Combustion Method for Steelmaking Applications," *44th Electric Furnace Conference Proceedings* (Dec. 9–12, 1986).

Hank Herin, "Experience with New Oxygen–Air–Fuel Burner System at Florida Steel Plant," *Industrial Heating* (Jan. 1998).

L. Mearns, "Experience with Controllable Air, Oxygen and Fuel Burners on EAFs at Bethlehem Steel's Bar, Rod and Wire Division," *Iron & Steelmaker* pp. 58–60 (May 1988).

"Combustion Assist for the EAF," *American Combustion Inc., Technical Bulletin 5–E* (Sep. 1986).

Gregory Gitman, "PYRETRON® Plus Burner Technology for EAFs," *1995 AISE Spring Convention*.

Gregory Gitman, "PYRETRON, a Variable Gas/Oxygen/Air Combustion System," *1986 Symposium on Industrial Combustion Technologies* (Apr. 20–30, 1986).

Gregory Gitman, "PYRETRON®, Controllable Air/Fuel/Oxygen Combustion Method," *1989 AISE Annual Convention* (Sep. 18–21, 1989).

(List continued on next page.)

*Primary Examiner*—John A. Jeffery
*Assistant Examiner*—Quang Van
*Attorney, Agent, or Firm*—Fitzpatrick, Cella, Harper & Scinto

[57] ABSTRACT

A method for providing main gas into a pool of molten metal, which is particularly useful for use in an electric arc furnace. The method employs combustion of secondary oxygen with fuel to form a flame envelope around a main gas stream which protects the main gas from entrainment of ambient gases as it passes through the headspace of the furnace. This enables the gas to retain to a substantial degree its original force upon injection into the headspace and thus may be injected into the furnace at a safe distance from the molten metal surface while still achieving substantially complete penetration into the molten metal.

37 Claims, 3 Drawing Sheets

OTHER PUBLICATIONS

Gregory Gitman et al., "Enhancement of EAF Performance with the Efficient Use of Exothermic Energy," *1997 Electric Furnace Conference Proceedings*, pp. 429–433 (1997).

Gregory Gitman, "EAF Thermal Enhancement with the Use of Gaseous and Solid Fuels," $53^{rd}$ *Electric Furnace Conference* (Nov. 12–14, 1995).

Gregory Gitman, "Optimization of Auxiliary Fuel Combustion in EAF," $21^{st}$ *Century Metallurgy of Russia and CIS* (Jun. 6–10, 1994).

Gregory Gitman, "Optimization of Auxililary Fuel Combustion in EAF," *Metallurgiya* (1994).

"Pyrelance," *American Combustion, Inc.*

Gregory Gitman, "Post–Combustion in the EAF," *Post Combustion in the EAF Panel*.

Jan. 25, 1999 Letter from V. Shver to PRAXAIR, with attached Jan. 23, 1999 opinion of William Marvin with its Appendices A–C.

Stoecker et al., "Fundamental Concepts of Oxygen Cutting", Welding Journal, pp. 151–s–156–s (1957).

LANCE/BURNER FOR MOLTEN METAL FURNACE

TECHNICAL FIELD

This invention relates generally to injecting gas such as oxygen into a furnace containing a pool of molten metal and is particularly advantageous for use in an electric arc furnace.

BACKGROUND ART

In the processing of molten metal in a furnace it is often desired to provide gas such as oxygen into the molten metal. A recent significant advancement for molten metal processing in an electric arc furnace is the post combustion method disclosed and claimed in U.S. Pat. No. 5,572,544—Mathur et al., wherein main oxygen is provided into the molten metal from above the surface of the molten metal pool, and post combustion oxygen is provided into the furnace above but close to the surface of molten metal pool. In such a system, because the main oxygen must penetrate into the molten metal pool, it must be injected into the furnace very close to the molten metal surface using one or more water cooled lances or injected into the molten metal at a point below the surface of the molten metal pool using one or more pipes. However, this expediency is still not satisfactory because the proximity of the tip of the gas injection device to the liquid surface causes excessive but unavoidable wear to the water cooled lance type oxygen injector. Pipes must be continually advanced to compensate for melting and oxidation of the end immersed in the molten steel bath which not only requires pipe manipulating equipment but also is expensive due to continual loss of pipe. Moreover, since the surface of the molten metal is not stationary, the oxygen injector must be continually moved to ensure that the oxygen injection is done at the proper location and with the proper nozzle to molten metal pool surface distance.

Accordingly, it is an object of this invention to provide a system for providing gas such as oxygen into a furnace containing a pool of molten metal wherein the gas passes into the molten metal pool, but excessive wear to the gas injection system is avoided.

There are times when it is desired to provide heat into a molten metal furnace, for example to melt scrap, in addition to providing gas into the molten metal pool. Accordingly, it is another object of this invention to provide a system for providing gas into a furnace so that the gas may be passed effectively into molten metal within the furnace while also providing heat into the furnace.

In the operation of an electric arc furnace it is desirable to generate a foamy slag layer above the molten metal pool. Accordingly it is a further object of this invention to provide a system for providing gas into an electric arc furnace so that the gas may be passed effectively into molten metal within the furnace while also generating a foamy slag above the molten metal.

In the operation of an electric arc furnace it is desirable to reduce the amount of fume which is generated. Accordingly, it is a further object of this invention to provide a system for providing gas into an electric arc furnace which minimizes the creation of splash and further provides a reducing atmosphere in the vicinity of the splash that does form to reduce the amount of fume formation.

In the operation of an electric arc furnace it is desirable to inject reagents such as carbon, lime, alloys, etc. in powder form into the bath. Accordingly, it is a further object of this invention to provide a system for providing gas into an electric arc furnace so that the gas may be passed effectively into molten metal within the furnace while also introducing powdered reagents into the molten metal.

SUMMARY OF THE INVENTION

The above and other objects, which will become apparent to those skilled in the art upon a reading of this disclosure, are attained by the present invention which is:

A method for providing gas into a furnace containing a bath which is comprised of a pool of molten metal with a layer of slag on its top surface, said method comprising:

(A) injecting a high velocity main gas stream into the furnace above the bath and injecting into the furnace fuel and secondary oxygen coaxially with the high velocity main oxygen stream;

(B) combusting fuel with secondary oxygen to form a flame envelope around the high velocity main gas stream; and (C) passing the high velocity main gas stream into the bath.

As used herein the term "oxygen" means a fluid having an oxygen concentration which exceeds that of air, preferably having an oxygen concentration of at least 30 mole percent, most preferably at least 80 mole percent. Oxygen may be commercially pure oxygen having an oxygen concentration of 99.5 mole percent or more.

As used herein the term "flame envelope" means a combusting stream substantially coaxial with the main gas stream and annular thereto.

As used herein the term "slag" means a molten or solid layer of oxides generally comprising one or more of calcium oxide, silicon dioxide, magnesium oxide, aluminum dioxide and iron oxide.

As used herein the term "foamy slag" means a slag which also contains a high volume fraction of gas bubbles such as carbon monoxide which greatly reduces the density of the slag layer and imparts a foam like appearance and behavior to the slag layer.

BRIEF DESCRIPTION OF THE DRAWINGS

The numerals in the Figures are the same for the common elements.

DETAILED DESCRIPTION

In general, the invention comprises the creation and use of a jet of high velocity main gas such as oxygen which is maintained coherent by a flame envelope around the high velocity jet. The coherency of the jet enables the injection point of the jet into the furnace to be placed a significant distance above the surface of the molten metal pool while still enabling the jet to penetrate the surface of the molten metal pool so that the high velocity main gas can pass into the molten metal pool. The flame envelope is formed by combusting fluid, preferably injected into the furnace in two fluid streams which are each annularly coaxial with the high velocity gas stream. One of the fluid streams is a fuel stream and the other is a secondary oxygen stream. The slower moving flame envelope resulting from the combustion of the two annular streams forms a fluid shield or barrier around the high velocity gas stream greatly reducing gases from outside the high velocity gas stream being entrained into the high velocity gas stream. Normally, as a high velocity fluid stream passes through air or some other atmosphere, gases are entrained into the high velocity stream causing it to expand in a characteristic cone pattern. By action of the flame envelope barrier, this entrainment is greatly reduced for a significant distance from the point of injection into the furnace, and the high velocity gas jet substantially retains its original diameter through this distance, i.e. is coherent through this distance. This coherency enables the jet to retain its ability to penetrate the molten metal bath and consequently the jet injection point can be spaced from the molten metal surface while still achieving adequate molten metal penetration. Moreover, if desired, the jet may contain powder or other additives which may be injected into the molten metal with the main gas.

A particularly advantageous application of this invention is its use in an electric arc furnace. In such practice the main gas jet comprises oxygen which reacts with carbon in the molten metal to form carbon monoxide which bubbles out of the molten metal. Post combustion oxygen reacts with this carbon monoxide above the surface of the molten metal pool providing additional heat into the furnace improving energy efficiency and productivity and reducing the level of deleterious carbon monoxide which is emitted into the atmosphere from the furnace.

The invention will be described in greater detail with reference to the drawings and also with reference to the electric arc furnace application for the invention.

Figure 2:
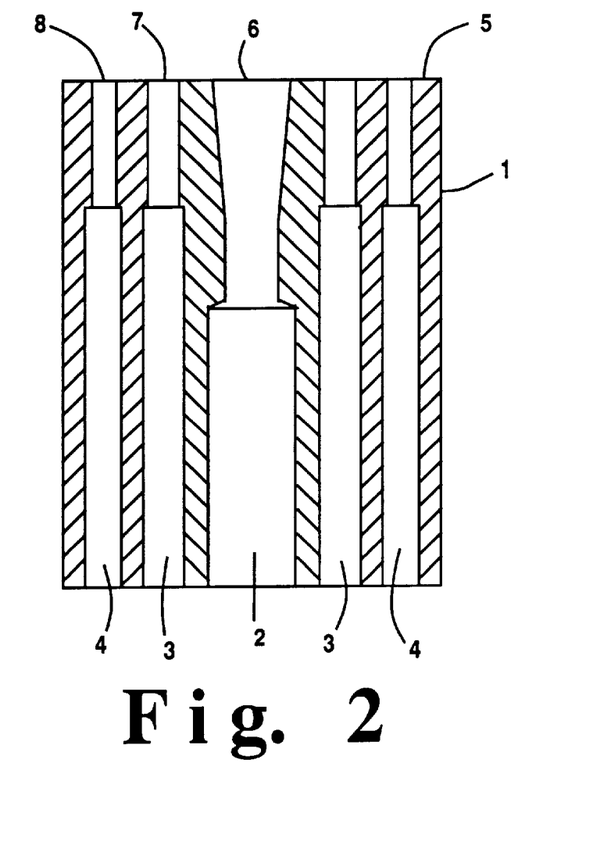
FIGS. 2 and 3 are detailed views of one embodiment, FIG. 2 being a cross sectional view and FIG. 3 being a head-on view, of the injection end of the lance/burner useful in the practice of this invention.
Figure 3:
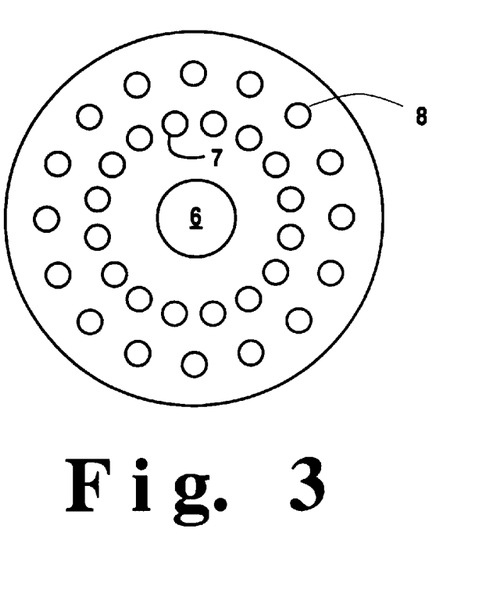

Referring now to FIGS. 2 and 3, there is illustrated lance 1 having a central conduit 2, a first annular passageway 3 and a second annular passageway 4, each of the annular passageways being coaxial with central conduit 2. Central conduit 2 terminates at injection end 5 of lance 1 to form main orifice 6. As illustrated in FIG. 2, central conduit 2 includes a converging/diverging nozzle. The first and second annular passageways also terminate at the injection end, preferably, as illustrated in the Figures, in substantially the same plane as main orifice 6. The first and second annular passageways may each form annular orifices around main orifice 6. Preferably, as illustrated in FIG. 3, first annular passageway 3 terminates at injection end 5 in a set of first injection holes 7 arranged in a circle around main orifice 6, and second annular passageway 4 terminates at injection end 5 in a set of second injection holes 8 arranged in a circle around main orifice 6 and first injection holes 7. Each of central conduit 2 and second annular passageway 4 communicate with a source of oxygen (not shown). The oxygen used in central conduit 2 and second annular passageway 4 may be the same oxygen fluid, or a different oxygen fluid may be used in second annular passageway 4 from that used in central conduit 2. First annular passageway 3 communicates with a source of fuel (not shown). The fuel may be any fuel, preferably is a gaseous fuel and most preferably is natural gas or hydrogen. In an alternative embodiment the fuel may be passed through the lance in the outermost annular passageway and the secondary oxygen may be passed through the lance in the inner annular passageway. In another alternative embodiment the fuel and secondary oxidant may be passed through the lance as a mixture through one annular passageway.

Figure 1:
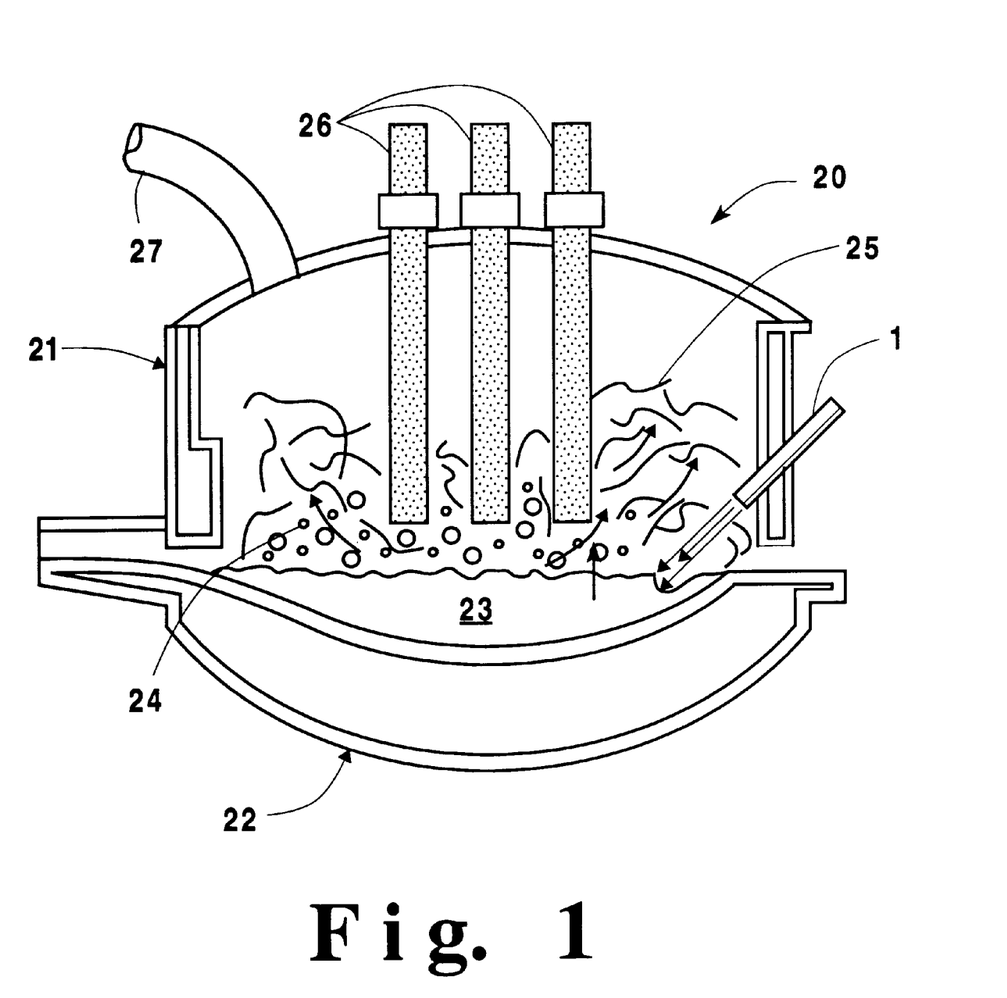
FIG. 1 is an elevation view partly in cross section of an embodiment of the lance/burner of this invention in operation in an electric arc furnace.

Referring to FIG. 1 there is shown electric arc furnace 20 having sidewall 21 and bottom wall 22 and containing a bath comprising a pool of molten metal 23. Generally the metal will comprise iron or steel. In FIG. 1 there is also illustrated a slag layer 24, which may be molten or solid, above the pool of molten metal and a layer of scrap metal 25 above slag layer 24. The slag layer generally comprises one or more of calcium oxide, silicon dioxide, magnesium oxide, aluminum dioxide and iron oxide. The scrap layer, if present, is melted by heat provided by electrodes 26 to form molten metal pool 23. The molten metal pool comprises, in addition to metal, oxidizeable matter such as carbon and/or hydrocarbons.

Figure 4:
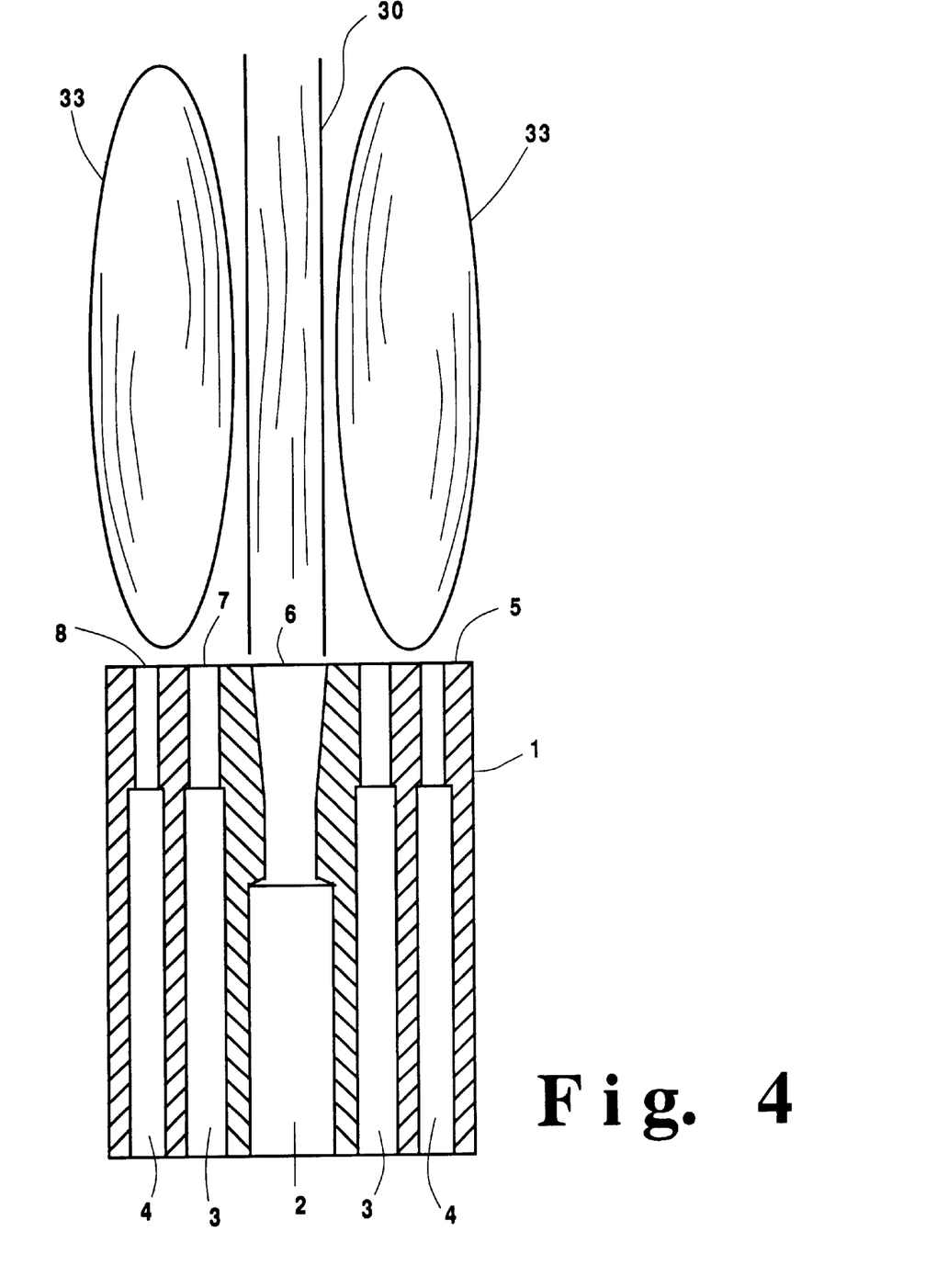
FIG. 4 is a representation of a preferred embodiment of the gas streams emitted from the lance/burner and of the flame envelope formed around the main gas stream in the practice of this invention.

Lance/burner 1 is positioned so as to pass through sidewall 21 with its injection end 5 above and spaced from the top surface of the bath by a distance along the jet axis of at least 20 d, and may be spaced from the bath by a distance along the jet axis of up to 100 d or more, where d is the exit diameter of the nozzle through which the main gas is ejected out from the lance/burner. The jet axis is the imaginary line running through the center of the jet along its length. Typically this spacing along the jet axis is within the range of from 30 d to 60 d. FIG. 1, for illustrative purposes, shows one lance used with the furnace. In commercial practice it may be preferable to use more than one lance. Preferably, three or four lances are used, and their locations are chosen to provide heat to the normally colder regions of the furnace, such as between the electrodes and near openings in the sidewall or roof of the furnace. Main oxygen is injected into furnace 20 through nozzle orifice 6 of lance 1 toward the bath comprising molten metal pool 23 at an initial jet axis velocity, generally at least 1000 feet per second (fps) and preferably at least 1500 fps, to form a high velocity main oxygen stream 30 as illustrated in FIG. 4. The jet axis velocity is the velocity of the gas stream at its jet axis. The main oxygen will contact the bath at a velocity of at least 50 percent, preferably at least 75 percent of the initial jet axis velocity of the main oxygen stream. Preferably the main oxygen has a supersonic velocity upon ejection from the lance and also has a supersonic velocity when it contacts the bath.

Simultaneously with the injection of main oxygen, fuel is injected into furnace 20 through first injection holes 7 and secondary oxygen is injected into furnace 20 through second injection holes 8 to form a fuel stream and a secondary oxygen stream, each of these streams being concentric to and coaxial with stream 30. Secondary oxygen combusts with fuel to form flame envelope 33 which has a velocity which is less than that of main oxygen stream 30 and generally is within the range of from 50 to 500 fps. The flame envelope forms at or very close, e.g. within one inch, to the lance tip and extends substantially, i.e. at least 75 percent of, the entire length of the main gas stream within the furnace to the bath. Preferably the flame envelope extends the entire length of the main gas stream within the furnace to the bath.

Flame envelope 33 forms a barrier or shield around oxygen stream 30 thereby greatly reducing the amount of gas outside of stream 30 from being entrained into stream 30. Thus stream 30 does not significantly expand from the point where it is injected into the furnace through lance 1 to the point where it impacts the bath comprising molten metal pool 23. Generally the diameter of stream 30 when it impacts the bath comprising molten metal pool 23 will be essentially the same as that when it is injected into furnace 20 through lance 1. Because stream 30 remains substantially coherent as it passes from the lance injection end to the surface of the bath, the injection end of the lance may be a large distance from the molten metal while still enabling the high velocity oxygen stream 30 to impact the molten metal pool surface with enough force so that the high velocity oxygen stream penetrates the bath surface and passes into the molten metal pool.

Within molten metal pool 23, the main oxygen in high velocity stream 30 reacts with oxidizeable matter within the molten metal pool. For example, the main oxygen may react with carbon in the molten metal pool to generate carbon monoxide in an exothermic reaction which provides additional heat to the furnace and stirs the molten metal to improve heat transfer. Gas generated by the reaction of main oxygen with oxidizeable matter within the molten metal pool bubbles up out of the molten metal pool. In many cases such gas or gases are in the form of incompletely combusted species, such as the aforesaid carbon monoxide. Such incompletely combusted species are environmentally deleterious and also represent an energy loss if allowed to pass unreacted out of the furnace. Post combustion oxygen provided into the furnace above the molten metal reacts with these incompletely combusted species as was previously described.

In one embodiment of this invention in the lance mode, the amount of fuel and secondary oxidant used is not significantly greater than that required to form the flame envelope. However, in some situations, it may be desirable to provide a large amount of heat into the furnace, such as, for example, to melt scrap in the furnace. In such situations a high flowrate of oxidant may be provided into the furnace and the fuel and oxidant, which may be secondary and/or main oxidant, is used to combust the fuel in order to generate heat for the furnace. That is, the lance used in the practice of this invention, may, if desired, also function as a burner i.e., in the lance/burner mode. In this way there is provided a very intense flame that can be used to penetrate and melt the scrap metal in order to provide an unobstructed passageway through which the oxygen jet may pass to reach the molten bath surface. Simultaneously, the flame can melt any scrap that may fall in front of the burner due to progression of scrap melting and cave-ins, thereby maintaining this passageway for bath lancing. The high natural gas flow rate can also provide a blanket of fuel gas around the coherent jet as it penetrates the molten metal bath. When the coherent jet penetrates the metal bath, a small localized cavity is formed and there is little deflection of the gas stream and little bath splashing. However, some spray may occur above the bath. The spray will be contained in a fuel gas blanket. This will prevent oxidation of metal droplets that leads to the formation of fume. Fume formation during lancing is thereby suppressed in two ways: (a) the amount of spray is greatly reduced by lancing with a coherent jet rather than a normal jet; and (b) the fuel gas blanket will prevent oxidation of metal droplets above the bath surface.

Moreover, in some situations it may be desirable to employ excess fuel and provide fuel into the molten bath along with the high velocity gas. One such situation would be to assist in generating a foamy slag in electric arc furnace practice. The foamy slag is very desirable in reducing energy losses from the electric arc and in reducing refractory wear at the furnace wall. In this situation, excess fuel such as natural gas is introduced into the slag layer where it undergoes decomposition and reaction to produce gases such as carbon monoxide, hydrogen and carbon dioxide which subsequently generates the desirable foamy slag. Moreover, in some situations it may be desirable to introduce reagents in powder form into the gas stream so that they may be effectively injected into the molten metal bath. Among such reagents one can name carbon, various compositions of lime, alloying additions, iron oxide, and dust produced by electric arc furnaces. Once the lance/burner of the invention is in place, it may also function solely as a burner during times when high velocity gas injection into the molten metal is not desired.

The following guidelines pertain to the design and operation of the invention as illustrated in FIGS. 2 and 3:

1) It is important to have some flow of oxygen in the outer ring of holes for all operating modes to stabilize the flames around the center jet. When operating in the lance and lance/burner modes, the flow of oxygen through the outer rings of holes should be at least 1% of the total oxygen flow and preferably in the range of about 5% to 10%.

2) When operating in the lance and lance/burner modes, the fuel gas flow rate through the inner ring of holes should be greater than that required to combust stoichiometrically with the oxygen in the outer ring of holes.

3) When operating in the lance and lance/burner modes, the velocity of the center jet should be greater than 500 fps and preferably greater than 1200 fps.

4) When operating as a burner to preheat and melt cold metal scrap, the portion of the oxygen flow rate to the outer ring of holes should be between 25 and 75% of the total oxygen flow rate, preferably between 40 and 60% of the total oxygen flow rate and the total oxygen should be between 100 and 200% of stoichiometric oxygen required to burn the fuel gas to completion.

5) When operating in the lance/burner mode to penetrate the partially melted scrap, the portion of the oxygen flow rate to the center jet should be greater than 50% and preferably between 75 to 99% of the total oxygen flow rate and the total oxygen should be greater than 100% stoichiometric oxygen required to burn the fuel gas to completion and preferably greater than 150%.

The following example of the invention is presented for illustrative purposes and is not intended to be limiting.

Using a system similar to that illustrated in FIG. 1, oxygen was injected into a molten metal bath. The oxygen was ejected from the lance tip through a nozzle having an exit diameter of 0.807 inch. The lance tip was positioned 28 inches above the surface of the bath and at a 40 degree angle to the horizontal so that the oxygen jet passed through a distance of 43 inches or 53 nozzle diameters from the lance tip to the bath surface. The main oxygen gas was enveloped in a flame envelope from the lance tip to the bath surface and had an initial jet axis velocity of 1600 fps and maintained this jet axis velocity of 1600 fps when it impacted the bath surface. About 85 percent of the oxygen ejected from the lance entered the molten metal pool and became available to react with constituents of the molten metal. About 367 standard cubic feet (SCF) of oxygen per ton of molten metal was needed to burn out about 20 pounds of carbon per ton of the molten metal compared with about 558 SCF of oxygen per ton of molten metal which was required for the same metallurgical operation but using conventional gas provision practice.

Now, by the use of this invention, one can more effectively provide gas into a molten metal furnace such as an electric arc furnace. Although the invention has been described in detail with reference to certain preferred embodiments, those skilled in the art will recognize that there are other embodiments of the invention within the spirit and the scope of the claims.

What is claimed is:

1. A method for injecting gas into, and penetrating the surface of, a pool of molten metal in a furnace from an injection point located in the furnace at a significant distance above the surface of the molten metal pool, wherein the molten metal pool has a layer of slag on its top surface, said method comprising:

(A) forming a coherent supersonic jet of gas in the furnace by
   (1) injecting into the furnace above the molten metal pool, through a nozzle directed toward the surface of the pool, (a) a main gas stream whose initial jet axis velocity is supersonic and (b) a fuel and a secondary oxygen coaxially with the supersonic main gas stream, and
   (2) surrounding the supersonic main gas stream with a flame envelope which is formed by combusting the fuel with the secondary oxygen and which extends substantially the entire length of the supersonic main gas stream in the furnace from the exit of the nozzle to the molten metal pool, wherein the nozzle has an exit diameter d and wherein the length of the supersonic main gas stream within the furnace is at least 20 d; and
(B) penetrating the surface of the molten pool with the main gas stream whose jet axis velocity at that point is still supersonic.

2. The method of claim 1 wherein the main gas comprises oxygen.

3. The method of claim 2 wherein the pool of molten metal contains carbon and said method further comprising reacting main oxygen with carbon within the molten metal pool to form carbon monoxide, bubbling carbon monoxide out of the molten metal pool and injecting additional oxygen into the furnace above the molten metal pool to oxidize said carbon monoxide that bubbles out of the molten metal pool.

4. The method of claim 1 wherein the fuel and the secondary oxygen are injected into the furnace in two streams, each of said two streams being concentric with the high velocity main gas stream.

5. The method of claim 1 wherein the flame envelope has a velocity which is less than that of the high velocity main gas stream.

6. The method of claim 1 wherein the fuel and the secondary oxygen are injected into the furnace as a mixture.

7. The method of claim 1 wherein the main gas stream comprises an inert gas.

8. The method of claim 1 wherein the fuel and the secondary oxygen combust to provide heat into the furnace in addition to forming the flame envelope.

9. The method of claim 1 further comprising a step wherein fuel is passed into the slag layer and reacts to form gas which serves to create a foamy slag layer.

10. This method of claim 9 wherein said gas which serves to create the foamy slag layer comprises carbon monoxide, hydrogen, carbon dioxide, water vapor or mixtures thereof.

11. The method of claim 1 wherein the main gas stream passed into the molten metal pool contains powder.

12. The method of claim 1 wherein the fuel is injected into the furnace at a flowrate which exceeds that required to combust stoichiometrically with the secondary oxygen injected into the furnace.

13. The method of claim 1 wherein the main gas stream is injected into the furnace at an initial jet axis velocity and contacts the bath at a velocity which is at least 50 percent of the initial jet axis velocity.

14. The method of claim 2 wherein the secondary oxygen is injected into the furnace at a flowrate which is within the range of from 25 to 75 percent of the total oxygen flowrate of the secondary oxygen and main gas oxygen injected into the furnace, and said total oxygen flowrate is within the range of 100 to 150 percent of that required to combust stoichiometrically with the fuel injected into the furnace.

15. The method of claim 2 wherein the main gas oxygen is injected into the furnace at a flowrate which is within the range of from 75 to 99 percent of the total oxygen flowrate of the secondary oxygen and main gas oxygen injected into the furnace, and said total oxygen flowrate is greater than 100 percent of that required to combust stoichiometrically with the fuel injected into the furnace.

16. The method of claim 1, wherein the main gas stream is injected into the furnace from a center opening of the nozzle, wherein the fuel is injected into the furnace from a plurality of holes arranged in a first circle around the center opening, and wherein the secondary oxygen is injected into the furnace from a plurality of holes arranged in a second circle around the first circle.

17. The method of claim 1, wherein the nozzle is a converging/diverging nozzle.

18. The method of claim 1, wherein the supersonic jet axis velocity of the main gas stream at the surface of the molten metal pool is at least 50% of its initial supersonic jet axis velocity.

19. The method of claim 1, wherein the supersonic jet axis velocity of the main gas stream at the surface of the molten metal pool is at least 75% of its initial supersonic jet axis velocity.

20. The method of claim 1, wherein the main gas stream is coherent for substantially its entire length in the furnace from the exit of the nozzle to the molten metal pool.

21. The method of claim 1, wherein more than one nozzle is provided and the nozzles are located in the sidewall of the furnace above the surface of the molten metal pool.

22. The method of claim 1, wherein the velocity of the flame envelope is less than that of the main gas stream.

23. The method of claim 1, wherein the length of the supersonic main gas stream is from 30 d to 60 d.

24. The method of claim 1, wherein the length of the supersonic main gas stream is over 100 d.

25. A method for injecting oxygen into, and penetrating the surface of, a pool of molten metal in an electric arc furnace from the nozzle of at least one oxygen lance located in the sidewall of the furnace at a position sufficiently above the surface of the molten metal pool so as to avoid excessive wear to the lance, wherein the molten metal pool has a layer of slag on its top surface, said method comprising:

(A) forming a coherent supersonic jet of oxygen in the furnace by
   (1) injecting into the furnace, from the nozzle directed toward the surface of the molten metal pool, (a) a center stream of oxygen whose initial jet axis velocity is supersonic and (b) a fuel and a secondary oxygen coaxially with the center supersonic oxygen stream, and
   (2) surrounding the center supersonic oxygen stream with a flame envelope which is formed by combusting the fuel with the secondary oxygen and which extends substantially the entire length of the center supersonic oxygen stream in the furnace from the exit of the nozzle to the molten metal pool, wherein the nozzle has an exit diameter d and wherein the length of the center supersonic oxygen stream within the furnace is at least 20 d; and
(B) penetrating the surface of the molten metal pool with the center supersonic oxygen stream whose jet axis velocity at that point is still supersonic.

26. The method of claim 25, wherein the center oxygen stream is injected into the furnace from a center opening of the nozzle, wherein the fuel is injected into the furnace from a plurality of holes arranged in a first circle around the center opening, and wherein the secondary oxygen is injected into the furnace from a plurality of holes arranged in a second circle around the first circle.

27. The method of claim 25, wherein the nozzle is a converging/diverging nozzle.

28. The method of claim 25, wherein the supersonic jet axis velocity of the center oxygen stream at the surface of the molten metal pool is at least 50% of its initial supersonic jet axis velocity.

29. The method of claim 25, wherein the supersonic jet axis velocity of the center oxygen stream at the surface of the molten metal pool is at least 75% of its initial supersonic jet axis velocity.

30. The method of claim 25, wherein the supersonic center oxygen stream is coherent for substantially its entire length in the furnace from the exit of the nozzle to the molten metal pool.

31. The method of claim 25, wherein more than one oxygen lance is provided, all of which are located in the sidewall of the furnace about the surface of the molten metal pool.

32. The method of claim 25, wherein the velocity of the flame envelope is less than that of the supersonic center oxygen stream.

33. The method of claim 25, wherein the length of the supersonic center oxygen stream is from 30 d to 60 d.

34. The method of claim 25, wherein the length of the supersonic center oxygen stream is over 100 d.

35. A method for injecting oxygen into, and penetrating the surface of, a pool of molten metal in an electric arc furnace from the converging/diverging nozzle of at least one oxygen lance located in the sidewall of the furnace at a position sufficiently above the surface of the molten metal pool so as to avoid excessive wear to the lance, and whose converging/diverging nozzle is directed toward the surface of the molten metal pool, wherein the molten metal pool has a layer of slag on its top surface, said method comprising:

(A) forming a supersonic jet of oxygen in the furnace which is coherent for substantially its entire length by
  (1) injecting into the furnace, from a center aperture of the converging/diverging nozzle directed toward the surface of the molten metal pool, (a) a center stream of oxygen whose initial jet axis velocity is supersonic and (b) a fuel and secondary oxygen coaxially with the center supersonic oxygen stream, and
  (2) surrounding the center supersonic oxygen stream with a flame envelope whose velocity is less than that of the supersonic center oxygen stream and which is formed by combusting the fuel with the secondary oxygen and which extends substantially the entire length of the center supersonic oxygen stream in the furnace from the exit of the nozzle to the molten metal pool, wherein the nozzle has an exit diameter d and wherein the length of the center supersonic oxygen stream within the furnace is at least 20 d; and (B) penetrating the surface of the molten metal pool with the center supersonic oxygen stream whose jet axis velocity at that point is still supersonic.

36. The method of claim 35, wherein the length of the center supersonic oxygen stream within the furnace is from 30 d to 60 d.

37. The method of claim 35, wherein the length of the center supersonic oxygen stream within the furnace is over 100 d.

* * * * *

UNITED STATES PATENT AND TRADEMARK OFFICE
CERTIFICATE OF CORRECTION

PATENT NO. : 6,125,133

DATED : September 26, 2000

INVENTOR(S) : PRAVIN CHANDRA MATHUR ET AL.

It is certified that error appears in the above-identified patent and that said Letters Patent is hereby corrected as shown below:

<u>ON TITLE PAGE AT [73] ASSIGNEE</u>

"Praxair, Inc." should read --Praxair Technology, Inc.--.

Signed and Sealed this

Twelfth Day of December, 2000

Attest:

Q. TODD DICKINSON

*Attesting Officer*   *Director of Patents and Trademarks*